(12) United States Patent
Baruah et al.

(10) Patent No.: US 7,843,967 B2
(45) Date of Patent: Nov. 30, 2010

(54) MULTIPLE PROTOCOL CROSS LAYER CUSTOMIZED QOS PROPAGATION AND MAPPING

(75) Inventors: Pritam Baruah, San Jose, CA (US); Arun Sharma, Pleasanton, CA (US); Timothy J. Lynch, San Francisco, CA (US); Ramanathan Lakshmikanthan, Milpitas, CA (US); Peter Arberg, Victoria (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 310 days.

(21) Appl. No.: 11/948,879

(22) Filed: Nov. 30, 2007

(65) Prior Publication Data

US 2009/0141740 A1 Jun. 4, 2009

(51) Int. Cl.
    *H04J 3/16* (2006.01)
(52) U.S. Cl. ...................... 370/469; 370/466
(58) Field of Classification Search ............. 370/392, 370/310, 466, 395.5, 395.52, 395.21, 401, 370/469, 375
    See application file for complete search history.

(56) References Cited

U.S. PATENT DOCUMENTS

| | | | |
|---|---|---|---|
| 6,600,741 B1* | 7/2003 | Chrin et al. | 370/375 |
| 6,633,571 B1* | 10/2003 | Sakamoto et al. | 370/401 |
| 6,975,639 B1 | 12/2005 | Hill et al. | |
| 7,136,382 B1* | 11/2006 | Sharma et al. | 370/392 |
| 7,257,121 B2* | 8/2007 | Kuhl et al. | 370/395.5 |
| 7,583,700 B1* | 9/2009 | Lin | 370/469 |
| 2002/0075875 A1* | 6/2002 | Dravida et al. | 370/395.21 |
| 2003/0202536 A1* | 10/2003 | Foster et al. | 370/469 |
| 2004/0109455 A1* | 6/2004 | Jouppi et al. | 370/395.52 |
| 2006/0126547 A1* | 6/2006 | Puuskari et al. | 370/310 |
| 2006/0126659 A1* | 6/2006 | Baum et al. | 370/466 |
| 2008/0019370 A1* | 1/2008 | Riley | 370/392 |
| 2008/0144644 A1* | 6/2008 | Allan et al. | 370/401 |

OTHER PUBLICATIONS

Micah Bartell, and Randy Zhang, "Effective BGP Policy Control", Cisco Press, Jan. 23, 2004, p. 1-4.

S. Blake, D. Black, M. Carlson, E. Davies, Z. Wang, and W. Weiss, "An Architecture for Differentiated Services", The Internet Society, Dec. 1998, RFC 2475, pp. 1-34.

(Continued)

*Primary Examiner*—Steven H Nguyen
*Assistant Examiner*—Syed Bokhari
(74) *Attorney, Agent, or Firm*—Blakely Sokoloff Taylor & Zafman, LLP (57) ABSTRACT

Techniques for multiple protocol cross layer customized QoS propagation and mapping are described herein. In one embodiment of the invention, a first QoS code of a packet is determined, the packet having a first encapsulation layer and a second encapsulation layer, the first QoS code being included within the first encapsulation of the packet. From application of a first cross layer QoS map to the first QoS code, determining that the second encapsulation layer of the packet should be used in determining a QoS classification. The reference point to the second encapsulation layer is stored. The QoS classification is determined with use of the reference point. A representation of the QoS classification is stored in a QoS descriptor and the QoS descriptor is used to influence processing of the packet. Other methods and apparatuses are also described.

25 Claims, 7 Drawing Sheets

OTHER PUBLICATIONS

K. Nichols, S. Blake, F. Baker, and D. Black, "Definition of the Differentiated Services Field (DS Field) in the IPvd and IPv6 Headers", The Internet Society, Dec. 1998, RFC 2474, pp. 1-19.

J. Heinanen, F. Baker, W. Weiss, J. Wroclawski, "Assured Forwarding PHB Group", The Internet Society, Jun. 1999, RFC 2597, pp. 1-11.

B. Davie, A. Charny, J.C.R. Bennett, K. Benson, J.Y. Le Boudec, W. Courtney, S. Davari, V. Firoiu, and D. Stiliadis, "An Expedited Forwarding PHB (Per-Hop Behavior)", The Internet Society, Mar. 2002, RFC 3246, pp. 1-15.

D. Black, S. Brim, B. Carpenter, F. Le Faucheur, "Per Hop Behavior Identification Codes", Network Working Group, Jun. 2001, Standards Track, RFC 3140, pp. 1-8.

* cited by examiner

ETHERNET CROSS-LAYER DESCRIPTOR
PROPAGATION MAP 210

| RULE ID 530 | QoS VALUE 540 | ACTION TO TAKE 550 |
|---|---|---|
| 1 | 000 | USE DSCP BITS |
| 2 | 001 | USE DSCP BITS AND APPLY IP MAP TO DSCP BITS |
| 3 | 010 | NULL |
| 4 | 011 | USE DSCP BITS |
| 5 | 100 | CHANGE VALUE TO 011 |
| 6 | 101 | USE DSCP BITS AND APPLY IP MAP TO DSCP BITS |
| 7 | 110 | CHANGE VALUE TO 000 |
| 8 | 111 | USE DSCP BITS |

FIG 5

ETHERNET CROSS-LAYER HEADER
PROPAGATION MAP 230

| RULE ID 630 | QoS DESCRIPTOR VALUE 640 | ACTION TO TAKE 650 |
|---|---|---|
| 1 | 000000 | USE DSCP BITS |
| 2 | 000001 | USE DSCP BITS AND APPLY IP MAP TO DSCP BITS |
| 3 | 000010 | NULL |
| 4 | 000011 | USE DSCP BITS |
| 5 | 000100 | CHANGE VALUE TO 000011 |
| 6 | 000101 | USE DSCP BITS AND APPLY IP MAP TO DSCP BITS |
| 7 | 000110 | CHANGE VALUE TO 000000 |
| ... | ... | ... |
| 64 | 111111 | INSERT 802.1P BITS INTO DSCP BITS |

FIG 6

QoS DESCRIPTOR 212

| PRIORITY 710 | DROP PRECEDENCE 720 | EXP 730 |
|---|---|---|

FIG 7

MULTIPLE PROTOCOL CROSS LAYER CUSTOMIZED QOS PROPAGATION AND MAPPING

CROSS-REFERENCE TO RELATED APPLICATIONS

Not Applicable.

BACKGROUND

1. Field

Embodiments of the invention relate to the field of quality of service (QoS); and more specifically, to the mapping and propagation of QoS codes in a differentiated services domain.

2. Background

A differentiated services domain may consist of multiple diverse interconnected networks, each of which providing differentiated quality of service (QoS) treatment for different classes of traffic. Information included in packet headers defines the QoS treatment levels. For example, certain priority or drop-precedence values encoded within packet headers define the QoS treatment levels. For example, in an Ethernet frame header, 802.1P bits may define the QoS treatment level of the Ethernet frame. Similarly, in an ATM cell header, CLP (cell loss priority) bits may define the QoS treatment level of the ATM cell. In a frame relay packet, the discard eligible (DE) bits may define the QoS treatment level of the frame relay packet. In an IP packet header, differentiated services code point (DSCP) bits may define the QoS treatment level of the IP packet. In a multiprotocol label switching (MPLS) SHIM header, experimental (EXP) bits may define the QoS treatment level of the MPLS path.

As part of the differentiated services domain, a packet may be transported through multiple interconnected differentiated service clouds (e.g., network clouds that support differentiated services architecture), each providing QoS according to different policies resulting from service level and peering agreements. As a result, each of these differentiated service clouds may include multiple network elements (e.g., switches and routers) each of which may propagate and map QoS bits from a packet to an internal per-packet QoS descriptor. In addition, each of the network elements may propagate and map QoS bits from the internal per-packet QoS descriptor to the outgoing packet.

Thus, as a packet travels from one differentiated service cloud to another differentiated service cloud, the packet may be treated differently depending on particular service level and peering agreements. In order to change the QoS level, one prior art technique includes applying a specific mapping function to a QoS code obtained from a particular layer's protocol header. The resulting new value may be copied to an internal QoS descriptor of a network element. This new internal QoS value may then influence the packet's QoS treatment as it is processed and forwarded by the network element. However, a limitation of this prior art technique is that in regards to certain network elements, only a subset of the QoS codes may be accessible to apply the map from (i.e., only a subset of the packet's layers' QoS codes may be accessible in the packet processing data path). For example, if the network element is a layer 2 or MPLS device, and the packet received includes layer 3 information (e.g., DSCP bits in the IP header), the network element may not use the layer 3 bits as this information (i.e., layer 3) will not be processed by the layer 2 or MPLS device.

Additionally, another limitation of this prior art technique is that the network element may have access to the layer 2 or layer 3 QoS codes only in isolation for the duration of processing the respective layer. For example, if the device is a layer 3 device, the layer 2 QoS codes and the layer 3 QoS codes may become accessible at different times over the packet processing timeline. As packet's protocol headers are processed layer by layer, a layer 3 device processes the layer 2 portion of the packet before processing the layer 3 portion of the packet. The layer 2 QoS codes are available only during processing of the layer 2 portion of the packet and similarly, the layer 3 QoS codes are available only during processing of the layer 3 portion of the packet.

Thus, the above prior art technique has the disadvantage that another layer in the packet besides the layer that is currently being processed cannot be used to determine a QoS code to propagate to the QoS descriptor. In other words, QoS mappings are limited to the packet layer that is currently being processed. The prior art technique is incapable of changing QoS treatment levels based on QoS codes from different layers of the packet than the layer currently being processed. Additionally, this prior art technique is incapable of specifying that for the current QoS code value (i.e., the QoS code of the layer that is currently being processed) the final mapping (i.e., the QoS code that should be inserted into the internal QoS descriptor) should be based on a QoS code from a different layer's protocol header.

In addition to the above prior art technique, another prior art technique allows QoS codes stored in an internal QoS descriptor to be propagated to the packet header of the packet layer currently being processed. The packet may then be sent to subsequent network elements with this QoS code in the packet header thus influencing the packet's QoS treatment by subsequent network elements in the network. In addition to propagation, the QoS code in the QoS descriptor may be used as input to a specific mapping function the output of which is inserted into the packet header of the packet layer currently being processed. This modification of the packet's protocol headers may influence its QoS treatment by subsequent network elements in the network. However, a limitation of this prior art technique is that in regards to certain network elements, only a subset of the QoS codes may be accessible to apply the map from (i.e., only a subset of the packet's layers' QoS codes may be accessible in the packet processing data path). For example, if the network element is a layer 2 or MPLS device, the network element may not use the layer 3 information of the packet to determine the QoS code to insert into the layer 2 protocol header as the layer 3 information is not accessible.

Additionally, another limitation of this prior art technique is that the network element may have access to the layer 2 or layer 3 QoS codes only in isolation for the duration of processing the respective layer. For example, if the device is a layer 3 device, the layer 2 QoS codes and the layer 3 QoS codes may become accessible at different times over the packet processing timeline. As packet's protocol headers are processed layer by layer, a layer 3 device processes the layer 2 portion of the packet before processing the layer 3 portion of the packet. The layer 2 QoS codes are available only during processing of the layer 2 portion of the packet and similarly, the layer 3 QoS codes are available only during processing of the layer 3 portion of the packet.

Thus, the above prior art technique has the disadvantage that another layer in the packet besides the layer that is currently being processed cannot be used to determine a QoS code to propagate to that layer. In other words, QoS mappings are dependent on the packet layer that is currently being processed. The prior art technique is incapable of changing QoS treatment levels based on QoS codes from different layers of the packet than the layer currently being processed.

Additionally, this prior art technique is incapable of specifying that for a particular QoS code value in the internal QoS descriptor the final mapping (i.e., the QoS code that should be propagated into the protocol header) should be based on a QoS code from a different layer's protocol header.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more network elements. Such network elements store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such network elements typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given network element typically stores code and data for execution on the set of one or more processors of that computer. Of course, one or more parts of an embodiment of the invention may be implemented using different combinations of software, firmware, and/or hardware.

A method and apparatus for multiple protocol cross layer QoS propagation and mapping is described. In one embodiment of the invention a QoS code from a first layer of a packet is determined and a cross layer QoS descriptor propagation map is applied to the QoS code where a result indicates that a QoS code from a second layer should be used in determining a QoS code to be propagated to a QoS descriptor. In another embodiment of the invention a QoS code from a QoS descriptor is determined and a cross layer QoS header propagation map is applied to the QoS code where a result indicates that a QoS code from a layer other than is currently being processed should be used in determining a QoS code to propagate to a header of the packet.

Figure 1:
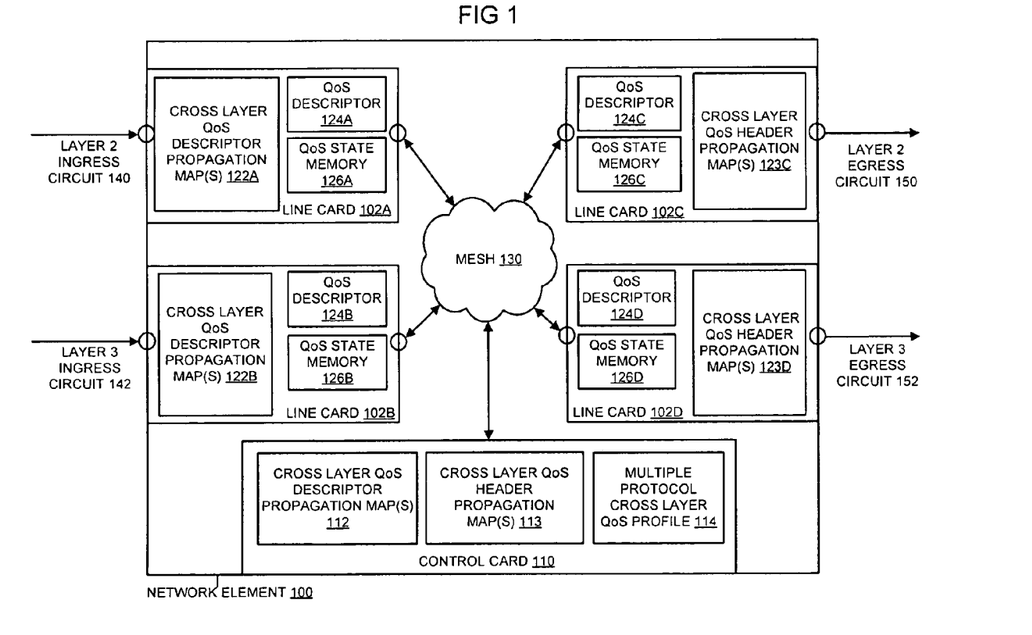
FIG. 1 illustrates an exemplary network element configured for multiple protocol cross layer mappings and propagations according to one embodiment of the invention.

FIG. 1 illustrates an exemplary network element 100 configured for multiple protocol cross layer QoS mappings and propagations according to one embodiment of the invention. Included within network element 100 are line cards 102A-D, control card 110, and mesh 130. In one embodiment of the invention, each of the line cards 102A-D and the control card 110 can include a processor and memory. The line cards 102A-D and the control card 110 are coupled with the mesh 130. In one embodiment of the invention, the control card 110 performs control, system configuration, and management tasks for the network element 100. For example, the control card 110 manages the one or more cross layer QoS descriptor propagation maps 112 and the one or more cross layer QoS header propagation maps 113, and uses these maps to update the one or more cross layer QoS descriptor propagation maps 122A-B and the one or more cross layer QoS header propagation maps 123C-D according to one embodiment of the invention. Also included in the control card 110 is a multiple protocol cross layer QoS profile 114. According to one embodiment of the invention the multiple protocol cross layer QoS profile 114 determines whether the line cards perform multiple protocol cross layer QoS mappings and propagations, and which of the one or more cross layer QoS descriptor propagation maps 112 and/or which of the one or more cross layer QoS header propagation maps 113 are applied to the line card (e.g., through an interface, circuit, etc.). It should be understood that in other embodiments of the invention there is no control card 110 and each line card manages their own propagation maps.

According to one embodiment of the invention, each of the one or more cross layer QoS descriptor propagation maps 112 represent a single protocol type. For example, the one or more cross layer QoS descriptor propagation maps 112 may include a cross layer QoS descriptor propagation map related to the IP protocol (e.g., DSCP bits), a cross layer QoS descriptor propagation map related to Ethernet (e.g., 802.1P bits), a cross layer QoS descriptor propagation map related to ATM (e.g., CLP bits), a cross layer QoS descriptor propagation map related to Frame Relay (e.g., DE bits), and a cross layer QoS descriptor propagation map related to MPLS (e.g., EXP bits). The number of rules in each of the cross layer QoS descriptor propagation maps is limited based upon the number of bits related to QoS in the protocol type. For example, the number of rules in an IP cross layer QoS descriptor propagation map is limited to the number 64 ($2^6$) as there are 6 DSCP bits. As another example, the number of rules in a Ethernet cross layer QoS descriptor propagation map is limited to the number 8 ($2^3$) as there are 3 802.1P bits. According to another embodiment of the invention, one or more protocol types are included in a combined cross layer QoS descriptor map.

According to one embodiment of the invention, each of the one or more cross layer QoS header propagation maps 113 represent a single protocol type. For example, the one or more cross layer QoS header propagation maps 113 may include a cross layer QoS header propagation map related to the IP protocol (e.g., DSCP bits), a cross layer QoS header propagation map related to Ethernet (e.g., 802.1P bits), a cross layer QoS header propagation map related to ATM (e.g., CLP bits), a cross layer QoS header propagation map related to Frame Relay (e.g., DE bits), and a cross layer QoS header propagation map related to MPLS (e.g., EXP bits). The number of rules in each of the cross layer QoS header propagation maps is limited based upon the number of bits related to QoS in the protocol type. For example, the number of rules in an IP cross layer QoS header propagation map is limited to the number 64 ($2^6$) as there are 6 DSCP bits. As another example, the number of rules in a Ethernet cross layer QoS header propagation map is limited to the number 8 ($2^3$) as there are 3 802.1P bits. According to another embodiment of the invention, one or more protocol types are included in a combined cross layer QoS header map. Additionally, according to another embodiment of the invention, one or more cross layer QoS descriptor propagation maps and one or more cross layer QoS header propagation maps are combined into a combined cross layer QoS propagation map.

Figure 7:
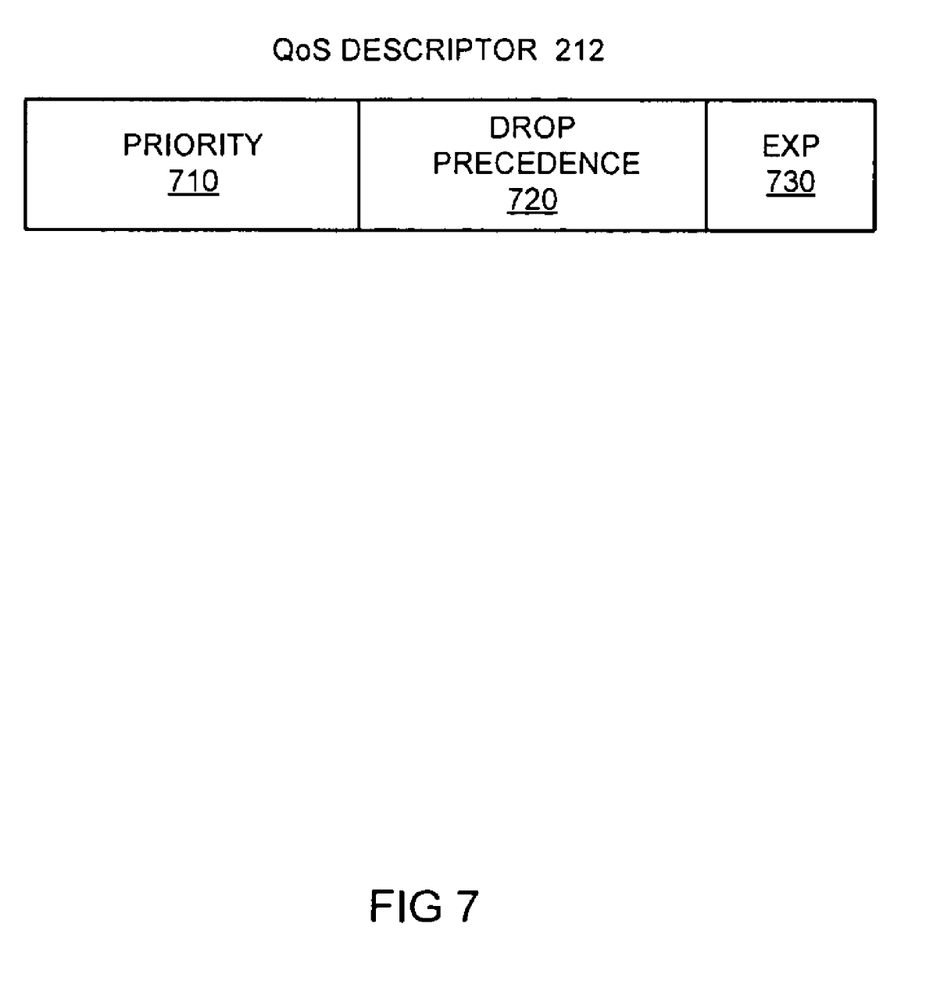
FIG. 7 illustrates an exemplary quality of service descriptor according to one embodiment of the invention.

In FIG. 1, the line cards 102A-B are ingress line cards. The ingress line cards 102A-B process incoming packets on the network element 100. For example, the ingress line card 102A processes layer 2 packets received on layer 2 ingress circuit 140. The ingress line card 102B processes layer 3 packets received on the layer 3 ingress circuit 142. Thus, the network element 100 is operating as a layer 2 network element and as a layer 3 network element. According to one embodiment of the invention, line card 102A transfers the packet through mesh 130, after processing the packet, to line card 102C if the packet has a destination elsewhere on the network. Similarly, line card 102B transfers the packet through mesh 130, after processing the packet, to line card 102D if the packet has a destination elsewhere on the network. Included within each line card 102A-102D is QoS descriptor 124A-124D respectively. According to one embodiment of the invention the QoS descriptors are properties of the packets that are being processed by the network element 100. Thus the line cards 102A-102D store a representation of the properties of the packets while the packets are being processed. Each QoS descriptor stores information relevant to the packet's QoS classification and treatment. For example, FIG. 7 illustrates an exemplary QoS descriptor according to one embodiment of the invention. In FIG. 7, the QoS descriptor includes a priority field 710, a drop precedence field 720, and an experimental (EXP) field 730. More discussion regarding QoS descriptors is given in reference to FIG. 2. Also included within each the line cards 102A-102D are QoS state memory 126A-126D respectively. It should be understood that in alternative embodiments of the invention a line card may operate as an ingress line card and an egress line card.

Figure 2:
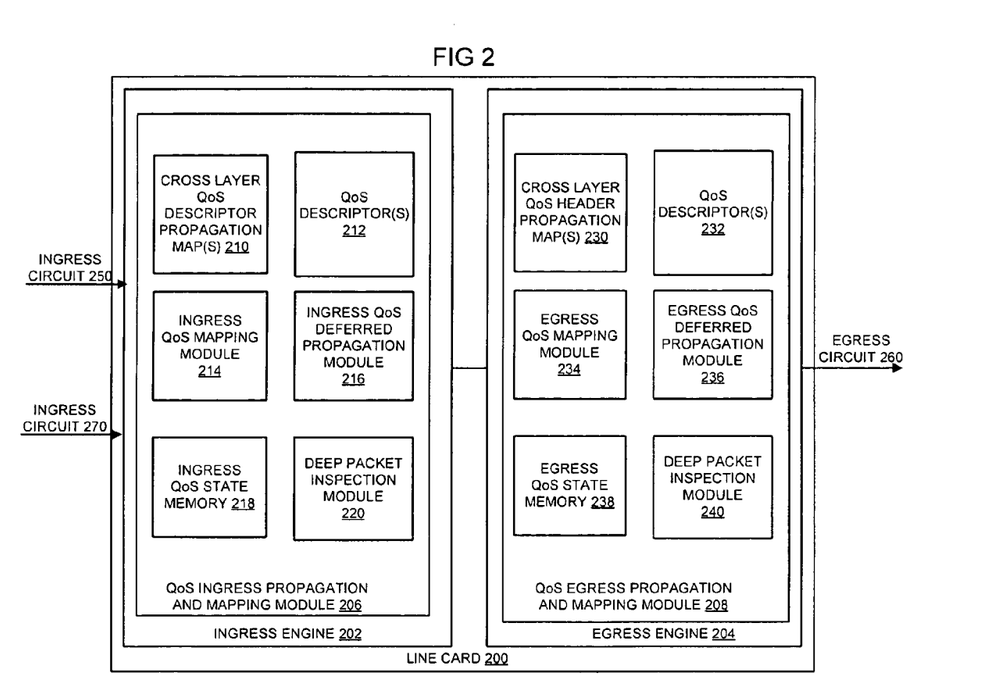
FIG. 2 illustrates an exemplary line card configured for multiple protocol cross layer mappings and propagations according to one embodiment of the invention.

FIG. 2 illustrates an exemplary line card 200 configured for multiple protocol cross layer mappings and propagations according to one embodiment of the invention. FIG. 2 will be discussed with reference to FIGS. 3A, 3B, 4, 5, 6, and 7. The operation of FIG. 2 will be described with reference to the exemplary embodiments of FIGS. 3A, 3B, 4, 5, 6 and 7. However, it should be understood that the operation of FIG. 2 can be performed by embodiments of the invention other than those discussed with reference to FIGS. 3A, 3B, 4, 5, 6 and 7, and the embodiments discussed with reference to FIGS. 3A, 3B, 4, 5, 6 and 7 can perform operations different than those discussed with reference to FIG. 2. Referring to FIG. 2, the line card 100 includes ingress engine 202 and egress engine 204. The ingress engine 202 processes incoming packets received on ingress circuit 250 (e.g., routing, switching, etc.). While in one embodiment of the invention the ingress circuit 250 carries layer 2 packets, in alternative embodiments of the invention the ingress circuit 250 carries different packets (e.g., MPLS, layer 3 packets, etc.). While not shown in FIG. 2, it should be understood that the ingress engine 202 processes other packets in addition to those received on the ingress circuit 250.

In addition, ingress engine 202 may treat packets differently according to a QoS code included within the packets. Each encapsulation layer of the packet may include a QoS code. For example, if a layer 3 packet (e.g., IPoE) is being processed by the ingress engine 202, the encapsulated layer 2 portion of the packet (e.g., Ethernet frame) may have a QoS code (e.g., represented with the 802.1P bits of the Ethernet frame) and the encapsulated layer 3 portion of the packet (e.g., IP) may have a different QoS code (e.g., represented by the DSCP bits of the IP packet header). If a network element is processing at layer 3 (e.g., a layer 3 router), that network element will process the layer 2 portion of the packet and the layer 3 portion of the packet. When processing the layer 2 portion of the packet the network element may treat the packet according to the QoS code included within the layer 2 portion. Similarly, when processing the layer 3 portion of the packet, the network element may treat the packet according to the QoS code included within the layer 3 portion of the packet. If a network element is processing at layer 2 (e.g., a network bridge), that network element typically processes only the layer 2 portion. Thus, the packet may be treated according to the QoS code included within the layer 2 portion.

According to one embodiment of the invention, ingress engine 202 includes QoS ingress propagation and mapping module 206 to modify QoS codes included within a packet and propagate QoS codes to a QoS descriptor. For example, if a packet's encapsulation layer originally includes an external QoS code that represents a medium priority level, the QoS ingress propagation and mapping module 206 may modify the internal QoS code to represent a different priority level (e.g., low, high, etc.). In addition, the ingress propagation and mapping module 206 may also determine an internal QoS code based on a QoS code in another encapsulation layer of the packet other than the one currently being processed. The QoS ingress propagation and mapping module 206 includes one or more cross layer QoS descriptor propagation maps 210, one or more QoS descriptors 212, an ingress QoS mapping module 214, an ingress QoS deferred propagation module 216, ingress QoS state memory 218, and deep packet inspection module 220. According to one embodiment of the invention, each of the one or more cross layer QoS descriptor propagation maps 210 represents a single protocol type. For example, one of the cross layer QoS descriptor propagation maps may be an Ethernet cross layer QoS descriptor propagation map. Additionally, according to one embodiment of the invention the number of rules in a cross layer QoS descriptor propagation map 210 is dependent upon the number of QoS bits in each protocol. For example, an Ethernet cross layer QoS descriptor propagation map is limited to 8 rules ($2^3$) as there are 3 802.1P bits.

Figure 3A:
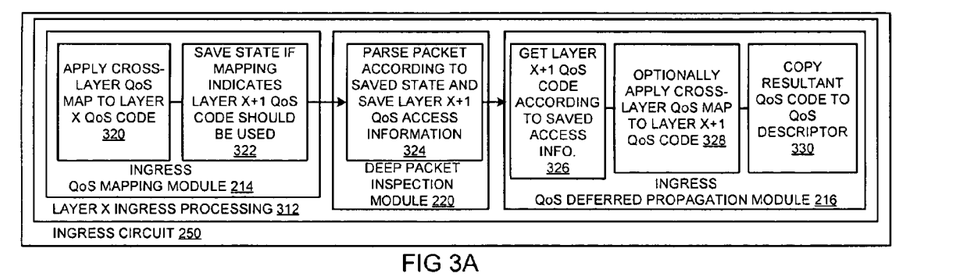
FIG. 3A illustrates an exemplary ingress forwarding processing circuit where a first layer is processed according to one embodiment of the invention.

With reference to FIG. 3A, the line card 200 is configured to process the packets received on the ingress circuit 250 at the layer X level with use of the ingress engine 202 as indicated by layer X ingress processing 312. The ingress engine 202 is also configured to perform multiple protocol cross layer QoS propagation and mapping on packets received on ingress circuit 250 (e.g., the multiple protocol cross layer profile 114 indicates that for packets coming in on the ingress circuit 250 multiple protocol cross layer QoS propagation and mapping should be performed). Additionally, the multiple protocol cross layer profile 114 indicates which of the one or more cross layer QoS descriptor propagation maps 210 to apply to packets received on the ingress circuit 250. For example, the multiple protocol cross layer profile 114 may indicate that for packets coming in on the ingress circuit 250 an Ethernet cross layer QoS descriptor propagation map should be applied. As another example, the ingress engine 202 processes layer 2 packets received on ingress circuit 250 and is configured to perform multiple protocol cross layer QoS propagation and mapping. As the ingress engine 202 processes layer X packets (e.g., layer 2) the ingress engine does not process encapsulated payloads beyond layer X (e.g., layer 3). For example, the line card 200 may be on a layer 2 network element (e.g., a layer 2 switch) that does not perform layer 3 processing. As part of the layer X ingress processing 312, after determining that multiple protocol cross layer QoS propagation and mapping should be performed and which cross layer QoS descriptor map 210 to use, the QoS code in the layer X header (e.g., the QoS code in the layer 2 header) is determined and at block 320 that cross layer QoS descriptor map 210 is applied to the QoS code.

Figure 5:
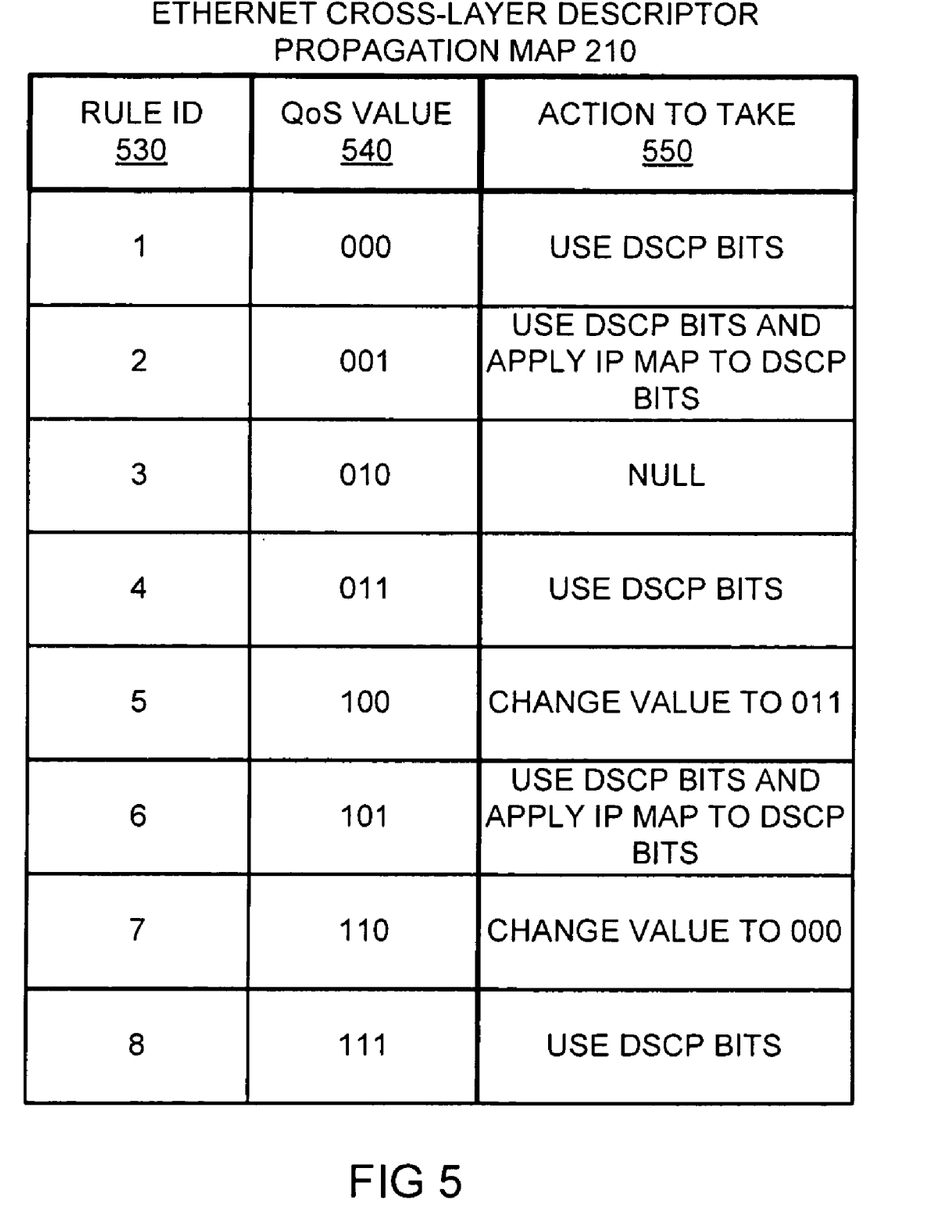
FIG. 5 illustrates an exemplary cross layer descriptor propagation map according to one embodiment of the invention.

FIG. 5 is an exemplary cross layer QoS descriptor propagation map 210 for the Ethernet protocol according to one embodiment of the invention. Included within the Ethernet cross layer descriptor QoS propagation map 210 is rule ID 530, QoS value 540, and action to take 550. For example, referring back to FIG. 2, if the ingress engine 202 is processing packets received on the ingress circuit 250 and is configured to apply the Ethernet cross layer QoS descriptor map and an Ethernet frame is received with a 802.1P QoS value of 000, the action to take column 550 indicates that the DSCP bits (i.e., QoS code of the IP header) should be used for the QoS classification of the packet. Thus the DSCP bits will be copied to one of the QoS descriptors 212. Thus a different protocol encapsulation layer's QoS code was used for the QoS classification of the packet.

As another example, if an Ethernet frame is received with an 802.1P QoS value of 001, the action to take column 550 indicates that the DSCP bits (i.e., the QoS code of the IP header) should be applied to an IP cross layer QoS descriptor propagation map, and the result of the second mapping should be used for the QoS classification of the packet. Thus, the result of the second mapping will be copied to one of the QoS descriptors 212. Thus, a different protocol encapsulation layer's QoS code was mapped to a different value and was used for the QoS classification of the packet. According to one embodiment of the invention, in certain circumstances the second mapping may further indicate another additional mapping and so on.

As another example, if an Ethernet frame is received with an 802.1P QoS value of 010, the action to take column indicates a null action. As a result, the 802.1P bits that were included in the packet are used for the QoS classification of the packet (i.e., there was not a mapping). Thus, the 802.1P bits (value 010) will be copied to one of the QoS descriptors 212. As a final example, if an Ethernet frame is received with an 802.1P QoS value of 100, the action to take column 550 indicates that the QoS value should be changed (i.e., mapped) to the value 011. Thus, in this example a cross layer propagation and mapping was not performed.

It should be understood that although FIG. 5 illustrates only an Ethernet cross layer QoS descriptor propagation map, there may be cross layer QoS descriptor propagation maps for other protocols (e.g., IP, Frame Relay, ATM, MPLS, etc). Each of these cross layer QoS descriptor propagation maps include rules that indicate that other encapsulation layers should be used in determining the QoS classification of the packet. For example, a cross layer QoS descriptor propagation map may include a rule that specifies that for a given MPLS EXP QoS value EXP-1, the DSCP bits from an encapsulated IP packet need to be propagated and optionally mapped (i.e., an IP cross layer QoS descriptor propagation map should be applied to the DSCP bits) to the QoS descriptor. As another example, a cross layer QoS descriptor propagation map may include a rule that specifies that for a given MPLS EXP QoS value EXP-2, the 801.1P bits from an encapsulated Ethernet packet need to be propagated and optionally mapped to the QoS descriptor. As another example, a cross layer QoS descriptor propagation map may include a rule that specifies that for a given ATM CLP QoS value CLP-1, the DSCP bits from an encapsulated IP packet need to be propagated and optionally mapped to the QoS descriptor. As another example, a cross layer QoS descriptor propagation map may include a rule that specifies that for a given ATM CLP QoS value CLP-2, the 802.1P bits from an encapsulated Ethernet packet need to be propagated and optionally mapped to the QoS descriptor. As another example, a cross layer QoS descriptor propagation map may include a rule that specifies that for a given Frame Relay QoS value DE-1, the DSCP bits from an encapsulated IP packet, the 802.1P bits from an encapsulated Ethernet frame, or the EXP bits from a MPLS packet need to be propagated and optionally mapped to the QoS descriptor.

Depending on the QoS protocol, an additional QoS classification mapping may need to be performed in order to insert the representation of the QoS value in to the QoS descriptor. For example, according to one embodiment of the invention the QoS descriptor is 6 bits. If the QoS value that is to be inserted into the QoS descriptor priority field 710 does not equal six bits, then an additional QoS classification mapping must be performed prior to inserting the QoS value into the QoS descriptor. According to one embodiment of the invention the possible values of the priority field 710 are designated into categories of QoS classification (e.g., high, medium, low, etc.). The QoS value that is to be inserted is applied to the QoS classification map and the result will be inserted into the QoS descriptor. It should be understood that many other ways of mapping the QoS value into the QoS descriptor may be performed. For example, according to one embodiment of the invention the cross layer QoS descriptor propagation map includes information to ensure that the QoS value that is inserted into the QoS descriptor matches the number of bits of the QoS descriptor. For example, as there are 3 802.1P bits in an Ethernet frame, the Ethernet cross layer QoS descriptor propagation map 210 may ensure that the 3 802.1P bits are mapped into the correct amount of bits of the QoS descriptor (e.g., 3 802.1P bits mapped into a 6 bit QoS descriptor).

Referring to FIG. 3A, if the mapping indicates that a QoS code from a subsequent layer (e.g., layer X+1) should be used in determining the QoS classification of the packet, at block 322 the state is saved in ingress QoS state memory 218 according to one embodiment of the invention. According to another embodiment of the invention, the state is stored per packet as packet meta-data. The state includes the QoS type of the encapsulation layer that is to be used in determining the QoS classification of the packet and any additional optional mapping that may be required as indicated by the cross layer descriptor propagation map 210. For example, the state corresponding to rule ID 1 includes the QoS type IP (DSCP) bits as indicated by the action to take column 550. The state corresponding to rule ID 2 includes the QoS type IP (DSCP) bits and the map that is to be applied to those DSCP bits (i.e., the IP cross layer QoS descriptor propagation map).

As previously described, the ingress engine 202 processes layer X ingress packets received on ingress circuit 250 as indicated by layer X ingress processing 312. As the result of the mapping indicated that the QoS code from a subsequent layer (e.g., layer X+1) should be used in determining the QoS classification of the packet and the ingress engine 202 does not typically process beyond layer X, the deep packet inspection module 220 parses the packet according to the saved state to determine the location in the packet of the QoS code that was indicated by the mapping at block 324. In other words, as the ingress engine 202 does not process that subsequent layer (e.g., layer X+1) from packets received on ingress circuit 250 the QoS code within that subsequent layer is not typically available without the deep packet inspection module 220 parsing the packet. In one embodiment of the invention the deep packet inspection module saves the layer X+1 QoS code access information (e.g., an offset) into local memory. This saved layer X+1 QoS code access information may be used during other packet processing features (e.g., layer 2 access control list, egress processing, etc.).

The ingress QoS deferred propagation module 216 retrieves the layer X+1 QoS code according to the saved layer X+1 QoS code access information at block 326. The ingress QoS deferred propagation module 216 applies the optional cross layer map to the layer X+1 QoS code if indicated by the saved state (i.e., if the first mapping indicated that an additional mapping should be performed) at block 328. Note that, in certain circumstances, the additional mapping may further indicate another additional mapping. The ingress QoS deferred propagation module further copies the resultant QoS code to one of the QoS descriptors 212 at block 330. The resultant QoS code is the final QoS code to be used for the QoS classification in the packet. Thus, the QoS code that is copied into the QoS descriptor determines the QoS classification for the packet.

Thus, a QoS code from a different encapsulation layer of the packet was used in determining the QoS classification for the packet. Thus, the QoS mapping and propagation to a QoS descriptor is not dependent on the packet encapsulation layer currently being processed. This allows a network administrator the functionality of using different layer's QoS codes in the treatment of the packet corresponding to a service level agreement (e.g., a contract between a customer and a service provider which sets the level of service to be accorded to the customer). For example, a layer 2 network element may use QoS codes that were set in a prior layer 3 network. Thus the packet's QoS classification may be consistent between layer 2 and layer 3 networks according to one embodiment of the invention.

Figure 3B:
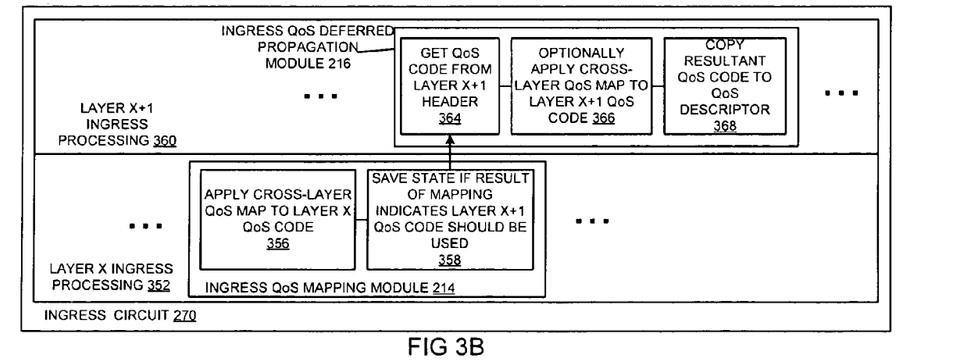
FIG. 3B illustrates an exemplary ingress forwarding processing circuit where a first layer and a subsequent second layer are processed according to one embodiment of the invention.

With reference to FIG. 3B, the line card 200 is configured to process the packets received on the ingress circuit 270 at the layer X encapsulation level and the layer X+1 encapsulation level with use of the ingress engine 202 as indicated by layer X ingress processing 352 and layer X+1 ingress processing 360. The ingress engine 202 is also configured to perform multiple protocol cross layer QoS propagation and mapping on packets received on ingress circuit 270 (e.g., the multiple protocol cross layer profile 114 indicates that for packets coming in on the ingress circuit 270 multiple protocol cross layer QoS propagation and mapping should be performed). Additionally, the multiple protocol cross layer profile 114 indicates which of the one or more cross layer QoS descriptor propagation maps 210 to apply to packets received on the ingress circuit 270. For example, the multiple protocol cross layer profile 114 may indicate that for packets coming in on the ingress circuit 270 an Ethernet cross layer QoS descriptor propagation map should be applied. For example, the ingress engine 202 processes layer 3 packets received on ingress circuit 270 and is configured to perform multiple protocol cross layer QoS propagation and mapping. As the ingress engine 202 processes layer X+1 packets, the layer X portion of the packet is processed prior to the processing of the layer X+1 portion. For example, if an IPoE packet is received over ingress circuit 270, the ingress engine 202 processes the layer 2 (Ethernet frame) prior to processing the layer 3 portion (IP header). Thus, a QoS code located in the layer 2 header may be accessed at a different processing time than a QoS code located in the layer 3 header. It should also be understood that the layer X encapsulation level and the layer X+1 encapsulation layer may be the same layer type (i.e., the same protocol layer level). For example, a layer X encapsulation layer may be an ATM cell and a layer X+1 encapsulation layer may be an Ethernet frame (both are layer 2 protocols). Thus, if an IPoEoATM packet is received over ingress circuit 270, the ingress engine 202 processes the layer 2 ATM cell header prior to processing the layer 2 Ethernet frame header. Thus, a QoS code located in one layer 2 header may be accessed at a different processing time than a QoS code located in another layer 2 header.

As part of the layer X ingress processing 352, after determining that multiple protocol cross layer QoS propagation and mapping should be performed and which cross layer QoS descriptor map 210 to use (e.g., the cross layer QoS descriptor propagation map associated with the ingress circuit 270), the QoS code in the layer X header (e.g., the QoS code in the layer 2 header) is determined and at block 356 that cross layer QoS descriptor map 210 is applied to the QoS code in the layer X header (e.g., the QoS code in the layer that is currently being processed). For example, referring to the exemplary Ethernet cross layer QoS descriptor propagation map 210, if the ingress engine 202 is processing an IPoE packet received on ingress circuit 270 and the QoS code in the Ethernet frame header is 001, the action to take column 550 of the cross layer QoS descriptor propagation map 210 indicates that the DSCP bits (i.e., the QoS code of the IP header) and an additional cross layer descriptor propagation map should be applied on the DSCP bits and the result of the second mapping should be used for the QoS classification of the IPoE packet.

If the mapping indicates that a QoS code from a subsequent layer (e.g., layer X+1) should be used in determining the QoS classification of the packet, at block 358 the state is saved in ingress QoS state memory 218 according to one embodiment of the invention. According to another embodiment of the invention, the state is stored per packet as packet meta-data. The state includes the QoS type of the encapsulation layer that is to be used in determining the QoS classification of the packet and any additional optional mapping that may be required as indicated by the cross layer descriptor propagation map 210. For example, the state corresponding to rule ID 2 of the exemplary Ethernet cross layer QoS descriptor propagation map includes the QoS type IP (DSCP) bits as indicated by the action to take column 550 of the cross layer QoS descriptor propagation map 210 and the map that is to be applied to those DSCP bits. As another example, the state corresponding to rule ID 1 includes the QoS type IP (DSCP) bits as indicated by the action to take column 550 of the cross layer QoS descriptor propagation map 210.

As previously described, the line card 200 is configured to process packets received on the ingress circuit 270 at the layer X encapsulation level and the layer X+1 encapsulation level with use of the ingress engine 202 as indicated by layer X ingress processing 352 and layer X+1 ingress processing 360. As the result of the mapping indicates that a QoS code from a subsequent layer (e.g., layer X+1) should be used in determining the QoS classification of the packet, the QoS code in that subsequent layer needs to be determined. Deep packet inspection (e.g., parsing the packet to determine the location of a particular QoS code) is expensive and should be avoided when possible. As the ingress engine 200 with reference to FIG. 3B is configured to process that subsequent layer (e.g., layer X+1) deep packet inspection can be avoided as the QoS code will become available at some later time during processing of the packet. Thus, the ingress engine 202 defers the QoS processing until the subsequent layer is processed and the QoS code becomes available. In other words, as ingress engine 202 processes packets received on the ingress circuit 270 at the encapsulation layer X and the encapsulation layer X+1, the QoS codes in encapsulation layer X+1 will become available during normal packet processing. For example, if the incoming packet encapsulation is IPoE and the ingress engine 202 is processing at layer 3, the DSCP bits in the IP header will become available at some time during the packet processing. Thus, during the layer X+1 processing 360, the ingress QoS deferred propagation module 216 retrieves the QoS code from the layer X+1 header according to the saved state at block 364. The ingress QoS deferred propagation module 216 applies the optional cross layer map to the layer X+1 QoS code if indicated by the saved state (i.e., if the mapping indicated that an additional mapping should be performed) at block 366. Note that, in certain circumstances, the additional mapping may further indicate another additional mapping. The ingress QoS deferred propagation module further copies the resultant QoS code to one of the QoS descriptors 212 at block 368. The resultant QoS code is the final QoS code to be used for the QoS classification in the packet. Thus, the QoS code that is copied into the QoS descriptor determines the QoS classification for the packet.

Thus, a QoS code from a different encapsulation layer of the packet was used in determining the QoS classification for the packet. Thus, the QoS mapping and propagation to a QoS descriptor is not dependent on the packet encapsulation layer currently being processed. This allows a network administrator the functionality of using different layer's QoS codes in the treatment of the packet corresponding to a service level agreement (e.g., a contract between a customer and a service provider which sets the level of service to be accorded to the customer). In addition, as the ingress engine processes the subsequent layer (e.g., the layer in which the QoS classification is to be based on), the ingress engine defers QoS processing until that subsequent layer is processed and the QoS code is available. Thus, instead of writing the first layer's QoS code to the descriptor and subsequently writing the subsequent layer's QoS code to the descriptor, a single write to the descriptor may be performed. Thus, a network administrator may specify that for the current QoS code (e.g., the QoS code in the header being processed) the final QoS classification should be based on a QoS code from a different layer's protocol header. In addition, certain types of traffic may be provided QoS treatment according to different protocols. For example, a service level agreement may define QoS levels based on layer 3 (e.g., DSCP bits) rather than on layer 2 (e.g., 802.1P bits). If the packet is leaving a layer 3 network element with the appropriate priority field in the DSCP field and is destined for a layer 2 network element, the layer 2 network element may employ multiple protocol cross layer QoS mapping and propagation to use those layer 3 (e.g., DSCP bits) in its treatment of the packet. In the prior art, this layer 2 network element is typically unable to use the layer 3 QoS bits.

In addition to propagating and mapping QoS codes to a QoS descriptor based on incoming packets, according to one embodiment of the invention QoS codes in the QoS descriptor may be propagated to outgoing packets. For example, referring to FIG. 2, the line card 200 includes egress engine 204. The egress engine 204 may include transmit queues and other outgoing processing features (e.g., egress traffic limiting, priority marking, traffic shaping, congestion control, avoidance, etc.). Packets are transmitted through egress circuit 260. According to one embodiment of the invention, the egress engine 204 includes the QoS egress propagation and mapping module 208 to modify a QoS code stored in a QoS descriptor 232 and propagate that modified QoS code to a header of an outgoing packet. This modified QoS code may influence the packet's QoS treatment by subsequent network elements. For example, if a QoS code in a QoS descriptor represents a medium priority QoS classification, the QoS egress propagation and mapping module 208 may modify that QoS code to represent a different priority QoS classification (e.g., low, high, etc.) and propagate that modified QoS code to one or more headers of an outgoing packet. In addition, the egress propagation and mapping module 208 may also modify a QoS code included in a QoS descriptor based on a QoS code in another encapsulation layer of the outgoing packet (e.g., a different encapsulation layer than is currently being processed) and propagate that modified QoS code to one or more headers of the outgoing packet. The QoS ingress propagation and mapping module 208 includes one or more cross layer QoS header propagation maps 230, one or more QoS descriptors 232, an egress QoS mapping module 234, an egress QoS deferred propagation module 236, egress QoS state memory 238, and deep packet inspection module 240. Similarly to the one or more cross layer QoS descriptor propagation maps 210, each of the one or more cross layer QoS header propagation maps 230 represents a single protocol type. For example, one of the cross layer QoS descriptor propagation maps may be an Ethernet cross layer QoS header propagation map. Additionally, according to one embodiment of the invention the number of rules in a cross layer QoS header propagation map 230 is dependent upon the number of bits in the QoS descriptor. For example, if the QoS descriptor has 6 bits, then the number of rules in the cross layer QoS header propagation map 230 is limited to 64 rules (2^6). While in one embodiment of the invention the one or more QoS descriptors 212 from the QoS ingress propagation and mapping module 206 are transmitted to the QoS egress propagation and mapping module 208, in alternative embodiments of the invention the one or more QoS descriptors 232 are different than the one or more QoS descriptors 212.

With reference to FIG. 2, the line card 200 is configured to process the packets destined to leave the network element on the egress circuit 260 with use of the egress engine 204 according to one embodiment of the invention. The egress engine 204 is also configured to perform multiple protocol cross layer QoS propagation and mapping on QoS codes in the QoS descriptor 232 and propagate them to one or more headers of an outgoing packet 270 (e.g., the multiple protocol cross layer profile 114 indicates that for packets leaving the network element on the egress circuit 260 multiple protocol cross layer QoS propagation and mapping should be performed). Additionally, the multiple protocol cross layer profile 114 indicates which of the one or more cross layer QoS header propagation maps 210 to apply to packets leaving on the egress circuit 260. For example, the multiple protocol cross layer profile 114 may indicate that for packets leaving the network element on the egress circuit 260 an Ethernet cross layer QoS descriptor propagation map should be applied. For example, the egress engine 204 processes layer 2 packets that are to be sent on the egress circuit 260 and performs multiple protocol cross layer QoS propagation and mapping. Generally, if a packet is being sent on egress circuit 260 the egress engine 204 adds an encapsulation layer (e.g., layer 2 encapsulation) to the packet (i.e., the packet is encapsulated into a layer that is created by the egress engine 204). For example, egress engine 204 may add an Ethernet frame to an IP packet to create an IPoE packet to send to another network element. The QoS codes in the encapsulated payload of the packet may not be accessible during typical egress processing. For example, if the egress engine 204 is processing MPLS and the outgoing packet encapsulation is IPoPPPoEoMPLSoE, only the EXP bits of the MPLS SHIM and the 802.1P bits of the outermost frame header are accessible during typical egress packet processing. In addition, the QoS codes that are accessible may become accessible during different times over the egress packet processing timeline. For example, if the egress engine 204 is processing layer 3 IP packets and the outgoing packet encapsulation is IPoE, then the 802.1P bits of the Ethernet frame header and the DSCP bits of the IP header may become accessible at different times.

Figure 4:
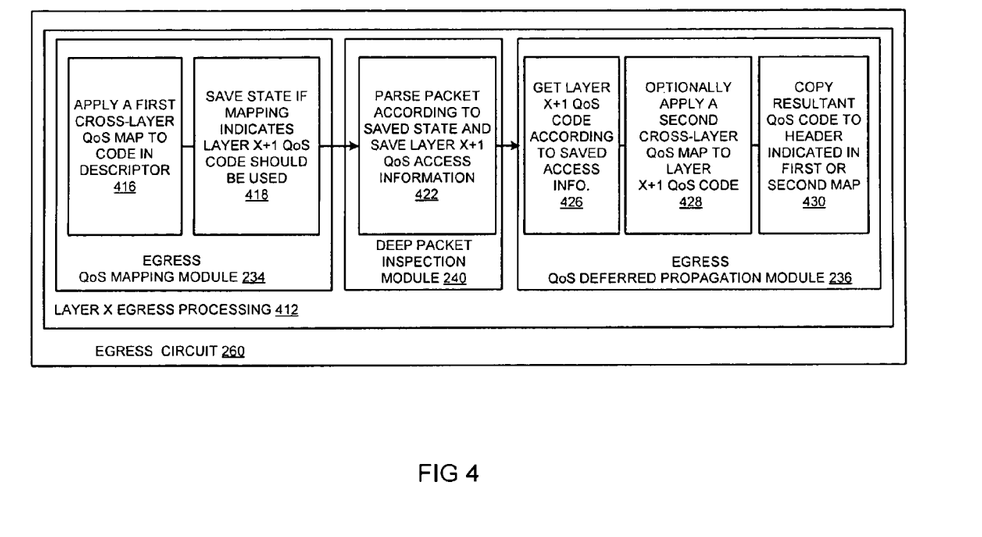
FIG. 4 illustrates an exemplary egress circuit where a first layer is processed according to one embodiment of the invention.

Referring to FIG. 4, as part of the layer X egress processing 412, after determining that multiple protocol cross layer QoS propagation and mapping should be performed on the outgoing packet and which cross layer QoS header map 230 to use (e.g., the cross layer QoS header propagation map associated with the egress circuit 260), the QoS code in the QoS descriptor is determined and at block 416 that cross layer QoS header propagation maps 230 is applied to the QoS code.

Figure 6:
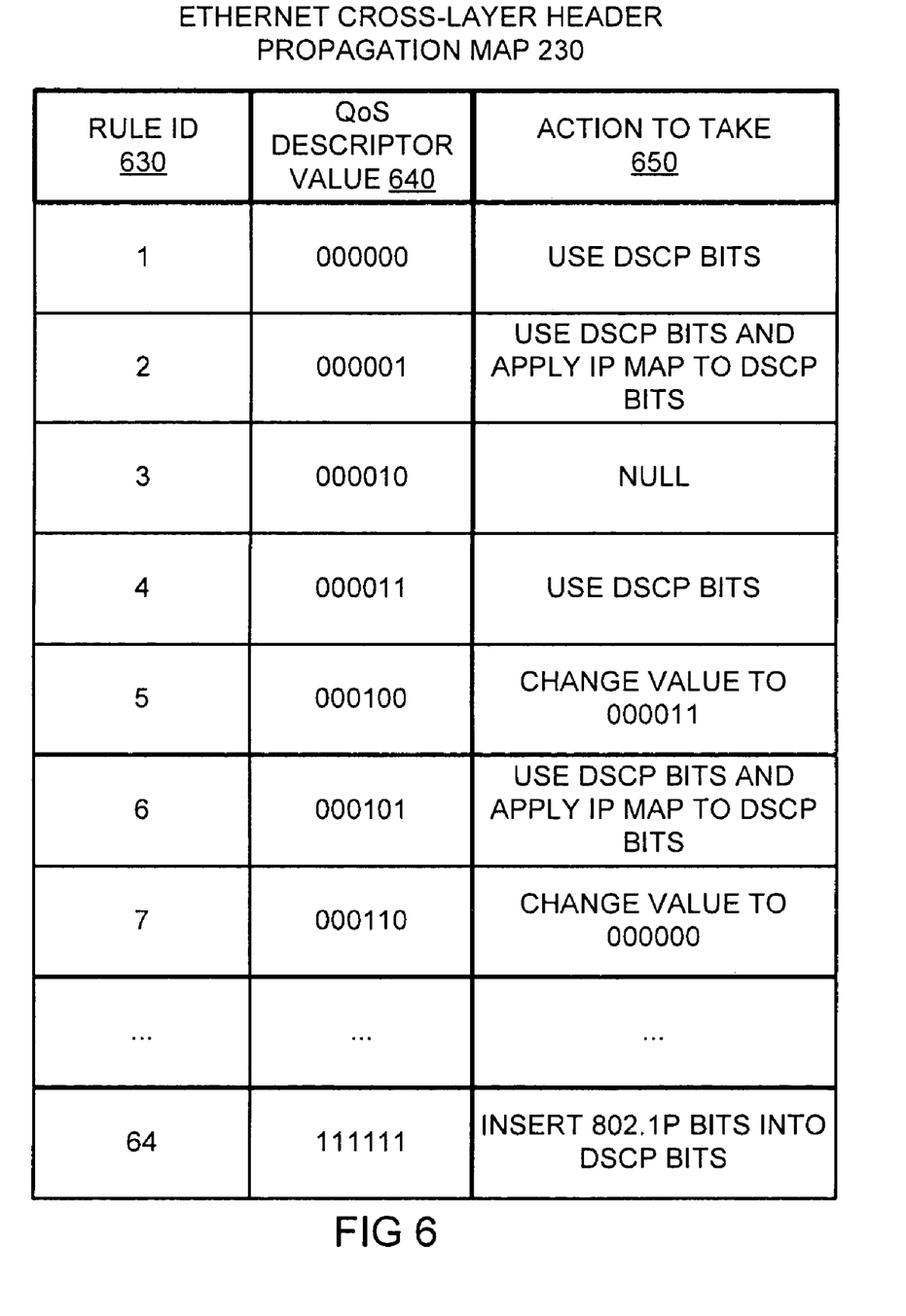
FIG. 6 illustrates an exemplary cross layer header propagation map according to one embodiment of the invention.

FIG. 6 is an exemplary cross layer QoS header propagation map 230 for the Ethernet protocol according to one embodiment of the invention. Included within the cross layer QoS header propagation map 230 are rule ID 630, QoS descriptor value 640, and action to take 650. QoS codes may be inserted into various protocol headers. For example, referring back to FIG. 2, if the egress engine 204 is processing packets leaving the egress circuit 270 and is configured to apply the Ethernet cross layer QoS header descriptor map and the QoS descriptor code is 000000, then the action to take column 650 indicates that DSCP bits of the encapsulated payload of the packet should be inserted into the Ethernet frame 802.1P bits. Thus, instead of copying the QoS value in the descriptor into the 802.1P bits, a different encapsulation layer's QoS code is inserted into the 802.1P bits. As another example, if the QoS descriptor code is 000001, then the action to take column 650 of the Ethernet cross layer QoS header propagation map 230 indicates that DSCP bits of the encapsulated payload should be applied to an IP cross layer QoS header propagation map and the resultant QoS code should be inserted into the 802.1P bits. As another example, if the QoS descriptor value is 000010, the action to take column 650 indicates a null action. As a result, the QoS descriptor value is copied into the 802.1P bits of the Ethernet frame. Thus, the QoS descriptor value 010 is copied into the 802.1P bits of the Ethernet frame. As another example, if the QoS descriptor value is 000100, the action to take column 650 indicates that the 802.1P bits should be modified to the value 000011.

According to one embodiment of the invention, QoS codes may be propagated to a header in the encapsulated payload. For example, if the outgoing packet encapsulation is IPoE a cross layer QoS header propagation map rule may indicate that for a particular value in the QoS descriptor the 802.1P bits from the Ethernet frame header should be inserted into the DSCP bits of the encapsulated IP header. Thus, referring to the cross layer QoS header propagation map 230 in FIG. 6, if the QoS descriptor value is 111111, then the action to take column 650 indicates that the 802.1P bits from the Ethernet frame header should be inserted into the DSCP bits of the encapsulated IP header.

It should be understood that although FIG. 6 illustrates only an Ethernet cross layer QoS header propagation map, there may be cross layer QoS header propagation maps for other protocols (e.g., IP, Frame Relay, ATM, MPLS, etc). Each of these cross layer QoS header propagation maps include rules that indicate that other encapsulation layers should be used in determining the QoS classification to insert into a header of the packet. For example, a cross layer QoS header propagation map may include a rule that specifies that for a given value V-2 of the QoS descriptor the DSCP bits from an encapsulated IP packet need to be propagated and optionally mapped (i.e., an IP cross layer QoS header propagation map should be applied to the DSCP bits) into the EXP bits of the outgoing MPLS frame. As another example, a cross layer QoS header propagation map may include a rule that specifies that for a given value V-3 of the QoS descriptor the 802.1P bits from an Ethernet frame need to be propagated and optionally mapped into the EXP bits of the outgoing MPLS frame. As another example, a cross layer QoS header propagation map may include a rule that specifies that for a given value V-4 of the QoS descriptor the DSCP bits from an encapsulated IP packet need to be propagated and optionally mapped into the CLP bits of the outgoing ATM cell. As another example, a cross layer QoS header propagation map may include a rule that specifies that for a given value V-5 of the QoS descriptor the 802.1P bits from an encapsulated Ethernet frame need to be propagated and optionally mapped into the CLP bits of the outgoing ATM cell. As another example, a cross layer QoS header propagation map may include a rule that specifies that for a given value V-6 of the QoS descriptor the DSCP bits from an encapsulated IP packet, the 802.1P bits from an encapsulated Ethernet frame, or the EXP bits from a MPLS packet need to be propagated and optionally mapped into the DE bit of the outgoing frame relay packet.

Depending on the QoS protocol, an additional QoS classification mapping may need to be performed in order to insert the QoS code into the particular packet header. For example, according to one embodiment of the invention the QoS descriptor is 6 bits. If the number of QoS bits of the header does not equal 6 bits, then an additional QoS classification mapping must be performed prior to inserting the QoS value into the packet header according to one embodiment of the invention. According to one embodiment of the invention the possible values of the QoS descriptor are designated into categories of QoS classification (e.g., high, medium, low, etc.). The QoS value that is to be inserted is applied to the QoS classification map and the result will be inserted into the packet header. It should be understood that many other ways of mapping the QoS value into the QoS descriptor may be performed. For example, according to one embodiment of the invention the cross layer QoS header propagation map ensures that the QoS code that is to be inserted into packet header matches the size of the QoS bits of that packet header.

Additionally, another mapping may need to be performed in order to map the QoS bits from one protocol into a size supported by the other protocol. For example, referring to Rule ID 1 of the Ethernet cross layer header propagation map 230 the DSCP bits are to be inserted into the 802.1P bits of the Ethernet frame of the outgoing packet. However, there are 6 DSCP bits and only 3 802.1P bits. Thus, an additional mapping needs to be performed to modify the 6 DSCP bits to fit into the 3 802.1P bits. In one embodiment of the invention each protocol classifies the possible QoS levels that are represented by their respective QoS bits. These levels may be used during this mapping (e.g., if the DSCP bits represent a high level, the 802.1P bits may be modified to represent a high level).

If the mapping indicates that a QoS code from a subsequent encapsulation layer (e.g., layer X+1) should be used in determining the QoS classification of the packet, at block 418 the state is saved in egress QoS state memory 238 according to one embodiment of the invention. According to another embodiment of the invention, the state is stored per packet as packet meta-data. The state includes the QoS type of the encapsulation layer that is to be used in determining the QoS classification of the packet and any additional optional mapping that may be required as indicated by the action to take column 650 of the cross layer QoS header propagation map 230. For example, the state corresponding to rule ID 1 of the Ethernet cross layer header propagation map 230 includes the QoS type IP (DSCP) bits as indicated by the action to take column 650 of the cross layer QoS header propagation map 210.

As previously described, the line card 200 is configured to process the packets destined to leave the network element on the egress circuit 260 with use of the egress engine 204. If the egress engine does not process the layer in which the QoS code is requested, a deep packet inspection to locate the QoS code in the outgoing packet is necessary according to one embodiment of the invention. Thus, deep packet inspection module 240 parses the packet according to the saved state to determine the location in the packet of the QoS code that was indicated by the mapping at block 422. In other words, as the egress engine does not process that subsequent layer (e.g., layer X+1) of the outgoing packet, the QoS code is not typically available without the deep packet inspection module 240 parsing the packet. In one embodiment of the invention the deep packet inspection module 240 saves the layer X+1 QoS code access information (e.g., an offset) in local memory. According to one embodiment of the invention the deep packet inspection is performed prior to the egress QoS mapping module 234 applying one of the cross layer QoS map to the code in the descriptor.

The egress QoS deferred propagation module 236 retrieves the layer X+1 QoS code according to the saved layer X+1 QoS code access information at block 426. The ingress QoS deferred propagation module 236 applies the optional cross layer QoS map to the layer X+1 QoS code if indicated by the saved state (i.e., if the first mapping indicated that an additional mapping should be performed) at block 428. Note that, in certain circumstances, the additional mapping may further indicate another additional mapping. The egress QoS deferred propagation module further copies the resultant QoS code to the header as indicated in the cross layer QoS map (either the original mapping or any subsequent mapping). The outgoing packet may then be sent to its destination and the modification of the QoS codes in the packet's protocol headers may influence the packet's QoS treatment by subsequent network elements as the packet traverses the network to its ultimate destination.

Thus, a QoS code from a different encapsulation layer of the packet that is not currently being processed was used in determining the QoS classification for the outgoing packet. Thus, the QoS mapping and propagation to a header of an outgoing packet is not dependent on the packet encapsulation layer currently being processed. This allows a network administrator the functionality of using different layer's QoS codes in the treatment of the outgoing packet corresponding to a service level agreement (e.g., a contract between a customer and a service provider which sets the level of service to be accorded to the customer). For example, if the network element that is processing the outgoing packet is a layer 2 network element and the packet is destined for a layer 3 network element, the network administrator may set the layer 2 portion of the packet with the layer 3 QoS code to be used by the subsequent layer 3 network element. Additionally, a network administrator may specify that for the current QoS code in the QoS descriptor the final QoS classification should be based on a QoS code from a different layer's protocol header. For example, a layer 3 network element may use layer 3 QoS codes only for packets bearing specific layer 2 QoS codes.

Additionally, mapping the QoS codes from one layer into another layer of the outgoing packet increases flexibility for a network administrator. For example, the network element that receives the outgoing packet may use layer 2 codes for ingress queuing or admittance control but the service level agreement is based on layer 3 codes. Thus, the network element that is sending the traffic may map the layer 3 code bits of the traffic into the layer 2 code bits of the packet allowing the ingress queuing or admittance control to be performed on subsequent network elements in accordance with the service level agreement. As another example, the network element that is performing cross layer QoS header mapping and propagation treats outgoing traffic (e.g., IPTV traffic) at a certain priority level but wishes subsequent network elements to treat the traffic at the same level. However, not all network elements that may receive the traffic are able to independently determine the correct level thus this network element may modify the traffic in an effort force the subsequent network elements to treat the traffic correctly.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer implemented method of selectively determining a quality of service (QoS) classification based on an incoming packet, comprising:

determining a first QoS code of a packet having a first encapsulation layer and a second encapsulation layer, the first QoS code being included within the first encapsulation layer of the packet;

determining, from application of a first cross layer QoS map to the first QoS code, that the second encapsulation layer of the packet should be used in determining the QoS classification;

storing a reference point to the second encapsulation layer;

determining the QoS classification with use of the reference point;

storing a representation of the QoS classification in a QoS descriptor; and using the QoS descriptor to influence processing of the packet.

2. The computer implemented method of claim 1 wherein the representation of the QoS classification corresponds to a second QoS code included within the second encapsulation layer of the packet.

3. The computer implemented method of claim 1 wherein the QoS classification is determined further by applying a second cross layer QoS map to a second QoS code that is included within the second encapsulation layer of the packet, wherein the result of the mapping indicates that a third QoS code should be the QoS classification.

4. The computer implemented method of claim 1 wherein the first encapsulation layer is layer 2 and the second encapsulation layer is layer 3, wherein the packet is processed on a layer 2 processing portion of a device, and wherein the QoS classification is determined further by applying deep packet inspection on the packet starting at the first encapsulation layer and traversing the packet through the reference point.

5. a computer implemented method of selectively determining a quality of service (QoS) code to insert into a header of a first encapsulation layer of an outgoing packet, comprising: during processing of the first encapsulation layer of the outgoing packet, performing the following: determining a first QoS code from a QoS descriptor; applying a first cross layer QoS map to the first QoS code; determining, from the application of the first cross layer QoS map, that a second encapsulation layer of the outgoing packet should be used in determining a second QoS code that is to be inserted into the header of the first encapsulation layer of the outgoing packet; determining the second QoS code; and inserting the second QoS code into the header of the first encapsulation layer of the outgoing packet.

6. The computer implemented method of claim 5, wherein the second QoS code is determined with use of a reference point, wherein the reference point is created by applying deep packet inspection on the packet starting at the first encapsulation layer and traversing the packet through the second encapsulation layer.

7. The computer implemented method of claim 6, wherein the second QoS code is included within a header of the second encapsulation layer of the outgoing packet.

8. The computer implemented method of claim 6, wherein the second QoS code is determined by applying a second cross layer QoS map to a third QoS code that is included within a header of the second encapsulation layer of the outgoing packet.

9. The computer implemented method of claim 6, wherein the second QoS code is further inserted into a header of the second encapsulation layer of the outgoing packet.

10. A network element configured to process packets according to quality of service (QoS) classifications, comprising:

a line card including, one or more cross layer QoS maps, one or more QoS descriptors to store QoS classifications, and an ingress engine to process incoming packets, the ingress engine including, an ingress QoS mapping module to apply a first one of the one or more cross layer QoS maps to a first QoS code included in a header of a first encapsulation layer of one of the incoming packets, and to save a reference point to a second encapsulation layer of that packet as a result of the application of that cross layer QoS map, and an ingress QoS deferred propagation module to retrieve a second QoS code included in the second encapsulation layer according to the reference point, and to determine an ingress resultant QoS code to copy into one of the one more QoS descriptors.

11. The network element of claim 10, wherein the ingress resultant QoS code corresponds to the second QoS code included in the second encapsulation layer.

12. The network element of claim 10, wherein the ingress QoS deferred propagation module further to apply a second one of the one or more cross layer QoS maps to the second QoS code to determine the ingress resultant QoS code.

13. The network element of claim 10 wherein the first encapsulation layer is layer 2 and the second encapsulation layer is layer 3, wherein the ingress engine processes layer 2 incoming packets, and wherein the ingress engine further includes a deep packet inspection module to parse the packet the packet starting at the first encapsulation layer and traversing the packet through the reference point to obtain the second QoS code's location, and wherein the ingress QoS deferred propagation module retrieves the second QoS code based on the second QoS code's location determined by the deep packet inspection module.

14. The network element of claim 10, wherein the line card further includes, an egress engine to process outgoing packets, wherein each outgoing packet includes a first encapsulation layer and a second encapsulation layer, the egress engine including, an egress QoS mapping module to apply a second one of the one or more cross layer QoS maps to a third QoS code included in one of the one or more QoS descriptors, and to save a reference point to the second encapsulation layer of the outgoing packet as a result of the application of that second cross layer QoS map, and an egress QoS deferred propagation module to retrieve a fourth QoS code included in the second encapsulation layer of the outgoing packet according to the reference point, and to determine an egress resultant QoS code to insert into the first encapsulation layer's header.

15. The network element of claim 14, wherein the egress engine further includes a deep packet inspection module to parse the packet the packet starting at the first encapsulation layer and traversing the packet through the reference point to obtain the fourth QoS code's location, and wherein the egress QoS deferred propagation module retrieves the fourth QoS code based on the fourth QoS code's location determined by the deep packet inspection module.

16. The network element of claim 15, wherein the egress resultant QoS code corresponds to the fourth QoS code.

17. The network element of claim 15, wherein the egress QoS deferred propagation module further to apply a third one of the one or more cross layer QoS maps to the fourth QoS code to determine the egress resultant QoS code.

18. The network element of claim 15, wherein the egress QoS deferred propagation module is further to insert the egress resultant QoS code into the second encapsulation layer's header of the outgoing packet.

19. A non-transitory machine-readable medium that provides instructions that, if executed by a processor, will cause said processor to perform operations for selectively determining a quality of service (QoS) classification based on an incoming packet, comprising:
   determining a first QoS code of a packet having a first encapsulation layer and a second encapsulation layer, the first QoS code being included within the first encapsulation layer of the packet;
   determining, from application of a first cross layer QoS map to the first QoS code, that the second encapsulation layer of the packet should be used in determining the QoS classification;
   storing a reference point to the second encapsulation layer;
   determining the QoS classification with use of the reference point;
   storing a representation of the QoS classification in a QoS descriptor; and
   using the QoS descriptor to influence processing of the packet.

20. The machine-readable medium of claim 19 wherein the representation of the QoS classification corresponds to a second QoS code included within the second encapsulation layer of the packet.

21. The machine-readable medium of claim 19 wherein the QoS classification is determined further by applying a second cross layer QoS map to a second QoS code that is included within the second encapsulation layer of the packet, wherein the result of the mapping indicates that a third QoS code should be the QoS classification.

22. The machine-readable medium of claim 19 wherein the first encapsulation layer is layer 2 and the second encapsulation layer is layer 3, wherein the packet is processed on a layer 2 processing portion of a device, and wherein the QoS classification is determined further by applying deep packet inspection on the packet starting at the first encapsulation layer and traversing the packet through the reference point.

23. a non-transitory machine-readable medium that provides instructions that, if executed by a processor, will cause said processor to perform operations for selectively determining a quality of service (QoS) code to insert into a header of a first encapsulation layer of an outgoing packet, comprising:
   during processing of the first encapsulation layer of the outgoing packet, performing the following: determining a first QoS code from a QoS descriptor; applying a first cross layer QoS map to the first QoS code; determining, from the application of the first cross layer QoS map, that a second encapsulation layer of the outgoing packet should be used in determining a second QoS code that is to be inserted into the header of the first encapsulation layer of the outgoing packet; determining the second QoS code; and inserting the second QoS code into the header of the first encapsulation layer of the outgoing packet.

24. The machine readable medium of claim 23, wherein the second QoS code is determined with use of a reference point, wherein the reference point is created by applying deep packet inspection on the packet starting at the first encapsulation layer and traversing the packet through the second encapsulation layer.

25. The machine readable medium of claim 24, wherein the second QoS code is included within a header of the second encapsulation layer of the outgoing packet.

\* \* \* \* \*

UNITED STATES PATENT AND TRADEMARK OFFICE
CERTIFICATE OF CORRECTION

| | | |
|---|---|---|
| PATENT NO. | : 7,843,967 B2 | Page 1 of 1 |
| APPLICATION NO. | : 11/948879 | |
| DATED | : November 30, 2010 | |
| INVENTOR(S) | : Baruah et al. | |

It is certified that error appears in the above-identified patent and that said Letters Patent is hereby corrected as shown below:

On the Title Page, in Field (54), in "Title", in Column 1, Line 2, delete "QOS" and insert -- QoS --, therefor.

In Column 1, Line 2, delete "QOS" and insert -- QoS --, therefor.

In Column 17, Line 37, in Claim 5, delete "a" and insert -- A --, therefor.

In Column 18, Line 35, in Claim 13, after "parse", delete repeated words "the packet".

In Column 18, Line 62, in Claim 15, after "parse", delete repeated words "the packet".

In Column 20, Line 11, in Claim 23, delete "a" and insert -- A --, therefor.

Signed and Sealed this
Fifteenth Day of March, 2011

David J. Kappos
*Director of the United States Patent and Trademark Office*